United States Patent
Detering et al.

(10) Patent No.: US 6,292,544 B1
(45) Date of Patent: Sep. 18, 2001

(54) MESSAGE WAITING INDICATOR IN A COMPUTER INTEGRATED TELEPHONY SYSTEM

(75) Inventors: Greig R. Detering, Phoenix; Eric A. Jones, Glendale, both of AZ (US)

(73) Assignee: AG Communcation Systems Corporation, Phoenix, AZ (US)

( * ) Notice: Subject to any disclaimer, the term of this patent is extended or adjusted under 35 U.S.C. 154(b) by 0 days.

(21) Appl. No.: 09/055,204

(22) Filed: Apr. 6, 1998

(51) Int. Cl.[7] .................................................. H04M 1/64
(52) U.S. Cl. ................................. 379/88.12; 379/90.01
(58) Field of Search ........................... 379/88.11, 88.12, 379/88.13, 90.01, 93.01, 93.05, 93.17

(56) References Cited

U.S. PATENT DOCUMENTS

| | | | |
|---|---|---|---|
| 4,747,126 | * 5/1988 | Hood et al. | 379/74 |
| 4,969,186 | * 11/1990 | Sayre, II | 379/376 |
| 5,363,431 | * 11/1994 | Schull et al. | 379/67 |
| 5,521,964 | * 5/1996 | Schull et al. | 379/67 |
| 5,764,758 | * 6/1998 | Shen | 379/372 |
| 5,805,677 | * 5/1988 | Ferry et al. | 379/93.35 |
| 6,064,732 | * 5/2000 | Pezullo et al. | 379/396 |
| 6,181,781 | * 1/2001 | Porter et al. | 379/88.17 |

* cited by examiner

Primary Examiner—Scott L. Weaver
(74) Attorney, Agent, or Firm—David J. Zwick

(57) ABSTRACT

A computer integrated telephone system that uses the computer's display, internal audio system, or an external interface to indicate that a voice message is waiting. The invention operates with a telephony protocol that supports in-band signaling having Message Waiting ON and Message Waiting OFF messages. The invention is embodied in a PC and includes a telephone interface that interacts with the telephone network to receive Message Waiting ON and Message Waiting OFF messages. In response to the Message Waiting ON message, the telephone interface communicates with software logic on the computer to cause the computer to indicate in an overt manner that a voice message is waiting. In response to the Message Waiting OFF message, the telephone interface communicates with software logic on the computer to cause the computer to turn off the message waiting indicator.

7 Claims, 2 Drawing Sheets

MESSAGE WAITING INDICATOR IN A COMPUTER INTEGRATED TELEPHONY SYSTEM

FIELD OF THE INVENTION

The present invention relates to the field of computer telephony, and more particularly to computer telephony in telecommunications systems that offer voice messaging services.

BACKGROUND OF THE INVENTION

Most telephone service providers offer voice messaging services for their subscribers. These services allow a calling party to leave a voice message for a subscriber when a call to the subscriber is unanswered or the line is busy. Many voice messaging services allow a calling party to send a message to a subscriber by accessing the voice messaging system directly without first calling the subscriber's directory number. The messages are then retrieved at the subscriber's convenience by accessing the voice messaging system via a telephone. Communications between the subscriber and the voice messaging system is over existing telephone lines.

When a voice message is received by the voice messaging system, it communicates with the central office switch and instructs the switch to send stutter dial tone to the subscriber's line when the subscriber's phone goes off-hook. The stutter dial tone serves to notify the subscriber that there are new voice messages waiting. When the subscriber has retrieved all new voice messages, the voice messaging system again communicates with the central office switch and instructs the switch to now send normal dial tone.

A problem with current voice messaging services is that they require the subscriber to lift the telephone handset and listen to the dial tone in order to check for new messages. Many subscribers will prefer the "hands-off" indicator of a traditional answering machine having a simple visual message waiting indicator, such as a lamp, or an audible indicator, such as a repeated beep.

One solution to this problem is to install equipment at the subscriber location to take advantage of in-band signaling protocols that support suppressed ringing messaging, such as the Voiceband Data Transmission Interface protocol as defined in the standards publications TR-NWT-000030, "Voiceband Data Transmission Interface Generic Requirements," Issue 2, Bellcore, October 1992, and SR-TSV-002476, "CPE Compatibility Considerations for the Voiceband Data Transmission Interface," Issue 1, Bul. 1, Bellcore, September 1993. This protocol is used to support Type I and Type II Caller ID (CID) and Caller ID on Call Waiting (CIDCW) applications.

Another in-band signaling protocol in use is the Analog Display Services Interface (ADSI) protocol, as defined in standards publications SR-INS-002461, "Customer Premises Equipment Compatibility Considerations for the Analog Display Services Interface," Issue 1, Bul. 3, Bellcore, December 1993, and TR-NWT-001273, "Generic Requirements for an SPCS to Customer Premises Equipment Data Interface for Analog Display Services," Issue 1, Rev. 2, Bellcore, June 1995. This protocol is used to support Type III CID and CIDCW applications on ADSI-compatible CPE. In particular, these protocols support Message Waiting ON and Message Waiting OFF in-band suppressed ringing message signaling.

In order to take advantage of the Voiceband Data Transmission Interface or the ADSI protocols, the user must install new equipment. This could result in prohibitively high expenses to individual users and businesses. However, many businesses and users already own PC's.

Accordingly, it is an object of the present invention to provide a computer integrated telephony system that uses the computer's display, internal audio system, or an external interface in concert with a telephony protocol that supports in-band signaling to indicate to a subscriber that a voice message is waiting.

SUMMARY OF THE INVENTION

The present invention is a computer integrated telephony system that uses the computer's display, internal audio system, or an external interface to indicate to a subscriber of a voice messaging service that a voice message is waiting. The present invention operates in concert with a telephony protocol that supports in-band signaling having Message Waiting ON and Message Waiting OFF messages associated with the voice messaging service.

The invention is embodied in a PC and includes a telephone interface that interacts with the telephone network in accordance with the messaging protocol and receives Message Waiting ON and Message Waiting OFF messages from the network.

In response to the Message Waiting ON message, the telephone interface communicates with software logic on the computer to cause the computer to indicate in an overt manner that the subscriber has a waiting voice message. In response to the Message Waiting OFF message, the telephone interface communicates with software logic on the computer to cause the computer to turn off the message waiting indicator.

DETAILED DESCRIPTION OF THE PREFERRED EMBODIMENT

The preferred embodiment of the present invention interacts with an ADSI telecommunications network in accordance with the ADSI protocol. When a caller leaves a message on a voice messaging system for a subscriber, or a subscriber has accessed all new messages, the voice messaging system requests the telephone switch to which the subscriber is connected to send a Message Waiting ON or Message Waiting OFF message, respectively, to the subscriber's ADSI-compatible CPE. The Message Waiting ON/OFF messages are preceded by an Open Switching Interval (OSI) to notify the subscriber's CPE that an ADSI message is forthcoming. The switch then sends an ADSI Message Waiting ON/OFF message to the subscriber's CPE. A complete discussion of the message flow between the ADSI CPE and the network is found in the aforementioned standards. Although the preferred embodiment of the present invention operates in an ADSI network as defined by these standards, the invention is not limited to such a network and is easily adapted to operate in any network that supports Message Waiting ON and Message Waiting OFF messages.

Figure 1:
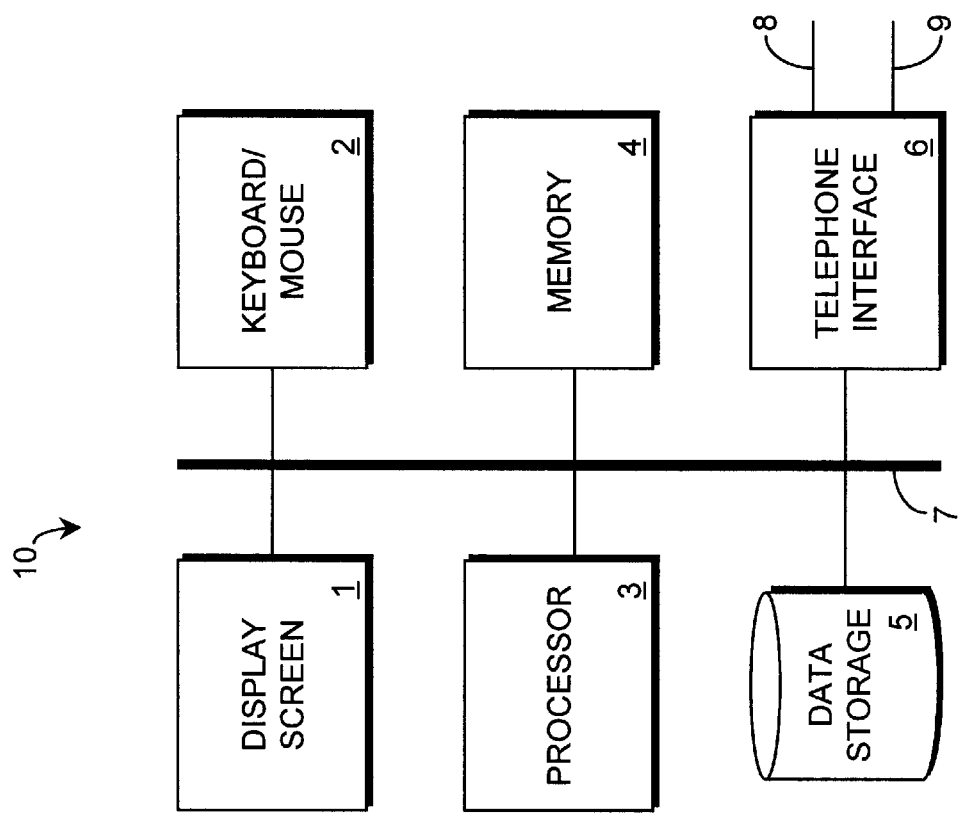
FIG. 1 shows a block diagram of the computer system in which the present invention operates.

FIG. 1 shows a general block diagram of computer system 10 of the preferred embodiment in which the present invention operates. Computer system 10 is preferably an IBM-compatible general purpose personal computer. Computer system 10 comprises processor 3, memory 4 comprising random access and read only memory for storing static and dynamic information and program instructions for processor 3, display screen 1, keyboard/mouse 2 for communicating commands and data to processor 3, and data storage 5 for storing data and program instructions. Telephone interface 6 for interacting with the ADSI telephone network is installed in computer system 10. All of the aforementioned computer system components including telephone interface 6 are connected to system bus 7. Telephone interface 6 is further connected to the ADSI network over connection 8, and to a regular (POTS) telephone over connection 9. To the ADSI network, the present invention appears to be an ADSI-compatible CPE. Alternatively, connection 9 to the POTS telephone may be omitted without changing the scope of the invention. Computer system 10 also has program logic that interacts with telephone interface 6.

Figure 2:
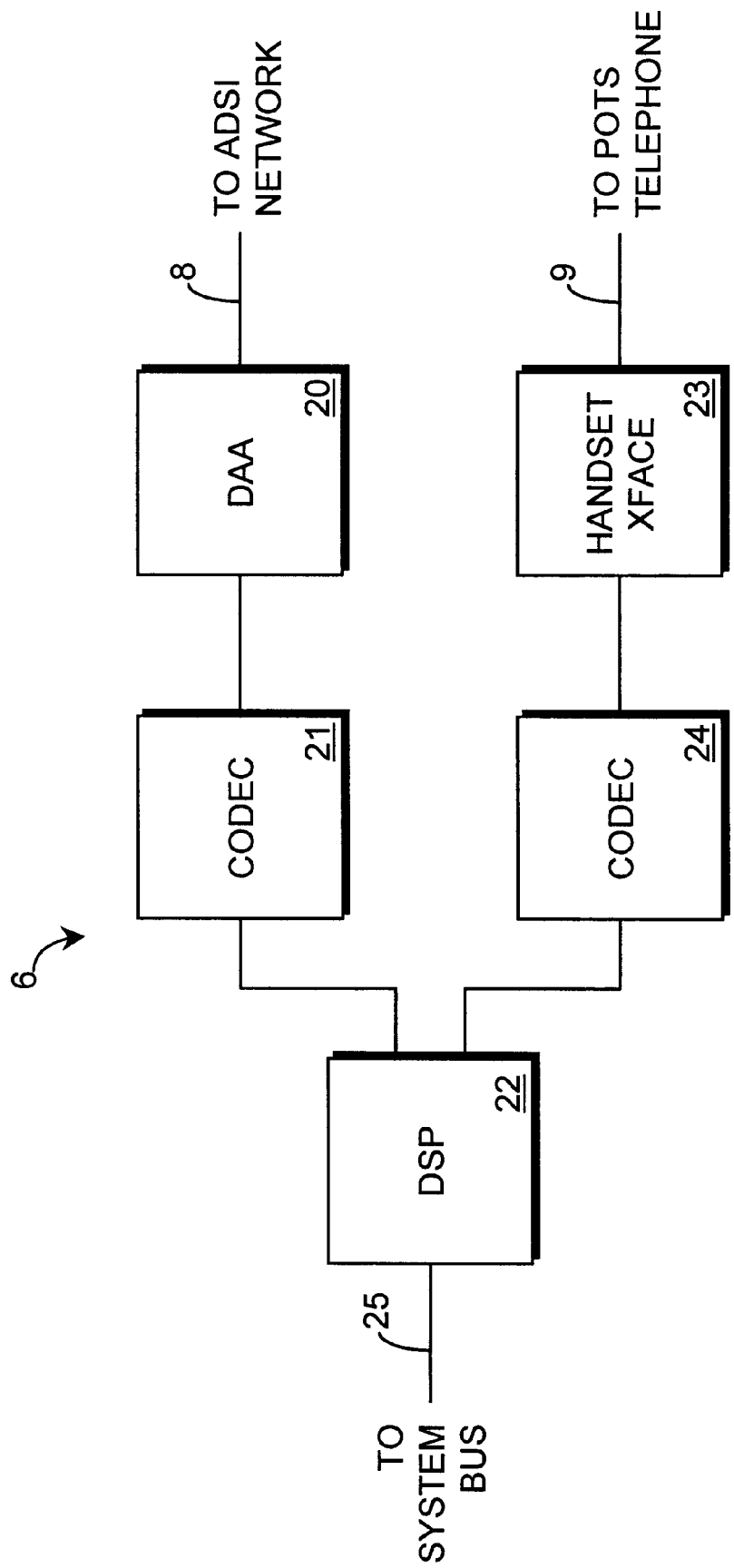
FIG. 2 shows a block diagram of the telephone interface of the present invention.

FIG. 2 shows a general block diagram of telephone interface 6 of the present invention. An analog signal is received by data access arrangement DAA 20 over connection 8. DAA 20 contains the circuitry necessary to control the electrical parameters of line 8 in the appropriate manner, dependent upon the status of the call, such that telephone interface 6 appears to the ADSI network to be a telephone instrument. Through control of these electrical parameters, which include the d.c. loop current and the line impedance, DAA 20 goes "off-hook" when ringing voltage is detected, and goes "on-hook" when a call is complete. In both off-hook and on-hook states, analog signals received by DAA 20 are passed to downstream components for further processing.

The analog signal from the network is then passed to CODEC 21 which converts the signal to a digital signal and transmits the digital signal to digital signal processor DSP 22. CODEC 21 must be provisioned such that, while DAA 20 is in an on-hook state, CODEC 21 processes and passes to DSP 22 all signals received from DAA 20.

DSP 22 exchanges control and data messages with program logic residing on computer system 10 via system bus 7 over connection 25. DSP 22 monitors the digital signal from CODEC 21 for a Message Waiting ON or Message Waiting OFF message, and when one is detected, notifies program logic that is executing on processor 3. This program logic then causes the computer to indicate in an overt manner that the subscriber has a waiting voice message, or causes the computer to cancel any waiting voice message indicators, respectively. The message waiting indicator could be, for example, a blinking icon or a message dialog box on computer display 1, an audible alarm from the computer's audio system, or enabling an external interface to cause equipment external to the computer to generate the message waiting indicator, such as light a lamp.

Although not integral to the invention, the common embodiment of the invention would include a connection 9 to a POTS telephone to provide the user with standard telephony functionality. The POTS telephone is connected over line 9 to handset interface 23 which includes hybrid circuitry to isolate the transmit and receive signals of the telephone, and a current source to provide power to the POTS telephone. Analog signals from the POTS telephone are passed by handset interface 23 to CODEC 24, which converts the signal to a digital signal and passes the digital signal to DSP 22. When used for standard telephony functionality, signals are passed bidirectionally through telephone interface 6, with CODEC 21 and CODEC 24 presenting DSP 22 with digital signals, and converting digital signals received from DSP 22 to analog signals.

The components of telephone interface 6 as shown in FIG. 2 are well known to those skilled in the art and are all commercially available.

In the preferred embodiment, telephone interface 6 comprises a modified model LS4000 Mwave DSP Adapter Card by IBM Corporation. Mwave is a trademark of IBM Corp. The LS4000 is a multimedia application system that, inter alia, provides a telephony interface which allows it to connect to the public switched telephone network (PSTN) by connecting between the PSTN and the telephone handset. The system provides a DAA, analog-to-digital and digital-to-analog converters, a programmable DSP, DTMF decoding and tone generation, FSK demodulation and data transfer capabilities, and host application interfaces through a set of Application Program Interface (API) calls. The LS4000 occupies an ISA/AT slot in an IBM-compatible personal computer with a 386SX-compatible processor.

In the present invention, the Mwave DSP Adapter Card is modified such that firmware controlling the Analog Interface Control, analogous to CODEC 21, will process signals received from the network on line 8 under all circumstances, and not just when ringing voltage is detected or when the DAA is off-hook.

The Mwave system is described generally in publication MMWGIMBKU-01, "The Mwave™ System Technology Description," First Edition, IBM Corp., March 1994; the LS4000 Mwave DSP Adapter Card is described in MMWLS4RDU-01, "Mwave™ System LS4000 Reference Design for MDSP1012," First Edition, IBM Corp., April 1994, both of which are hereby incorporated by reference. Mwave development toolkits and application libraries are commercially available. The design and use of multimedia applications using Mwave technology, including computer integrated telephony applications, is well known to those skilled in the art.

Operation of the invention is controlled by program logic typically residing in memory 4 and executed by processor 3. The program logic is preferably executed as one task in a multi-tasking operating system, such as the Windows operating system by Microsoft. Windows is a trademark of Microsoft Corp. The application is started when the computer system is initialized, for example by including a "shortcut" pointing to the application in the Windows Startup File, and then runs in background mode. An incoming Message Waiting ON or Message Waiting OFF message detected by telephone interface 6 causes the application to become the active task.

While specific computer hardware and software is described, it will be apparent to those skilled in the art that other hardware and software may be used within the scope of the present invention. For example, systems that are not IBM-compatible may be used. The computer operating system may be either multitask or single-task. Telephone interface 6 may be any combination of discrete and integrated components that will provide the required functionality in combination with a compatible computer system.

While a preferred embodiment of a system for indicating a waiting message in a computer integrated telephone system has been particularly shown and described, it is not intended to be exhaustive nor to limit the invention to the embodiment disclosed. It will be apparent to those skilled in the art that modifications can be made to the present invention without departing from the scope and spirit thereof. It is intended that the scope of the invention be defined by the claims appended hereto and their equivalents.

What is claimed is:

1. In a computer system, a system for indicating a waiting message for use in a telephone network having a source of Waiting Message ON and Waiting Message OFF messages, comprising:

a telephone interface connected to said network and operated to receive and detect said Waiting Message ON and Waiting Message OFF messages, said telephone interface comprising a digital access arrangement connected to said telephone network and operated to pass all analog signals received from said network, a coder/decoder connected to said digital access arrangement and operated to receive said analog signals and to convert said analog signals to digital signals while said telephone is in an on-hook state, a digital signal processor connected to said coder/decoder and operated to receive said digital signals and further operated to detect in said digital signals said Waiting Message ON and Waiting Message OFF messages;

means to indicate a waiting message in response to said Waiting Message ON message; and means to cancel said indicator of a waiting message in response to said Waiting Message OFF message.

2. A system for indicating a waiting message according to claim 1, wherein said telephone interface comprises a multimedia application system adapted to process all analog signals from said network while said multimedia application system is in an on-hook state.

3. A system for indicating a waiting message according to claim 1, wherein said means to indicate a waiting message comprises a visual indication on the display screen of said computer system.

4. A system for indicating a waiting message according to claim 1, wherein said means to indicate a waiting message comprises an audible indication from the audio system of said computer system.

5. A system for indicating a waiting message according to claim 1, wherein said computer system including an external interface connected to an external system, wherein said means to indicate a waiting message comprises an overt indication from said external system.

6. A system for indicating a waiting message according to claim 1, wherein said telephone network operates in accordance with the Voiceband Data Transmission Interface protocol.

7. A system for indicating a waiting message according to claim 1, wherein said telephone network operates in accordance with the Analog Display Services Interface protocol.

* * * * *